United States Patent
Stewart et al.

(10) Patent No.: US 7,425,899 B2
(45) Date of Patent: Sep. 16, 2008

(54) ELECTROMAGNETIC TAGS

(75) Inventors: Paul J. Stewart, Los Altos, CA (US);
Diana K. Smetters, Belmont, CA (US);
David K. Fork, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 103 days.

(21) Appl. No.: 11/296,916

(22) Filed: Dec. 8, 2005

(65) Prior Publication Data
US 2007/0132592 A1 Jun. 14, 2007

(51) Int. Cl.
*G08B 13/14* (2006.01)
(52) U.S. Cl. ............... 340/572.4; 340/572.1; 340/568.1
(58) Field of Classification Search ............ 340/572.1, 340/572.4, 572.8, 572.9, 573.4, 571, 568.1, 340/539.11, 10.1; 235/375, 385, 462.2, 462.01
See application file for complete search history.

(56) References Cited

U.S. PATENT DOCUMENTS

| | | | | |
|---|---|---|---|---|
| 4,369,363 A | * | 1/1983 | Quint et al. | 250/214.1 |
| 6,104,295 A | * | 8/2000 | Gaisser et al. | 340/573.4 |
| 7,164,359 B2 | * | 1/2007 | Waterhouse et al. | 340/572.1 |
| 7,229,023 B2 | * | 6/2007 | Raskar | 235/492 |
| 7,232,067 B1 | * | 6/2007 | Bromer | 235/385 |

FOREIGN PATENT DOCUMENTS

EP 1478159 11/2004

OTHER PUBLICATIONS

"Compact, low power modulated retroreflection using MEMS micromirrors", Thomas Bifano, ARL Coop Project, Photonics Center, Jan. 14, 2005, http://bifano.bu.edu/tgbifano/Web/PDSfiles/Retro.pdf (12 pgs.).
"RFID Locating Systems for Linking Valued Objects with Multimedia Files", Jeff Lindsay et al., Nov. 25, 2003, https://priorart.ip.com/viewPub.jsp?pubID=IPCOM000021113D (9 pgs.).
"Seeing-Is-Believing: Using Camera Phones for Human-Verifiable Authentication", Jonathan M. McCune, et al., Carnegie Mellon University (15 pgs.), 2005.
"Enhancing Privacy for RFID Passports", Henning Shulzrinne, Columbia University, Apr. 21, 2005, http://www.cs.columbia.ed/~hgs/papers/2005/passport.pdf (2 pgs.).

* cited by examiner

*Primary Examiner*—Van T. Trieu
(74) *Attorney, Agent, or Firm*—Fay Sharpe LLP

(57) ABSTRACT

An electromagnetic tag includes a communication component, which includes an optical transmitter/emitter that transmits/emits optically encoded information.

18 Claims, 5 Drawing Sheets

US 7,425,899 B2

ELECTROMAGNETIC TAGS

BACKGROUND

The following generally relates to tags. More particularly, it is directed to electromagnetic tags such as optical tags. However, essentially all passive and/or active tags are contemplated.

Conventional tagging technology includes passive and active tags. Passive tags generally include the broad category of tags that are visually readable by a human, but do not have signal reception, transmission/emission, computation, and/or storage capabilities. Examples of such tags include price tags, washing directions on clothing, etc. Some passive tags are discernable, but not readable (e.g., bar codes, glyphs, etc.). Others are designed to be hard to detect or hidden. One example of such a tag is a watermark, which is a human-invisible manipulation of an image used to encode data.

Active tags provide signal reception, transmission/emission, computation, and/or storage capabilities. Some are self-powered, either by battery or other source, while others are powered by a reader and/or writer, either directly or through some medium like Radio Frequency (RF) or magnetic energy. Many electromagnetic based tags derive power from the field generated by the reader/writer and are able to communicate by interfering with the incident field in a way that the reader/writer can detect. In some instances, such tags simply return an identifier. In other instances, tags store information, perform computations such as cryptography, and/or have sensors in the physical world whose state they can report.

Unfortunately, tags, readers, and/or writers can be compromised by malicious entities such that the information communicated to and from a tag can be corrupted and/or stolen. In addition, it may not be possible for the holder of a tag or reader to detect misbehavior since the communication medium may be undetectable by individuals. Moreover, many individuals do not have intuitions about the behavior of electrostatic, magnetic and/or electro-magnetic communication mediums that allow them to make safe assumptions about the security of their tags.

BRIEF DESCRIPTION

In one aspect, an electromagnetic tag is illustrated. The electromagnetic tag includes a communication component, which includes an optical transmitter/emitter that transmits/emits optically encoded information.

DETAILED DESCRIPTION

Figure 1:
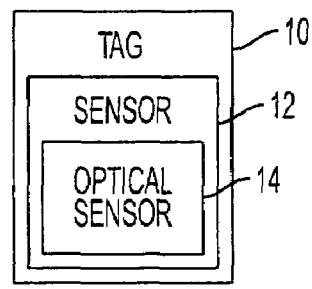
FIG. 1 illustrates an exemplary electromagnetic tag with a sensor for detecting light.

FIG. 1 illustrates a tag 10 that is invoked by electromagnetic (EM) radiation, as well as other invoking sources. Examples of suitable invocation include toggling a state (e.g., "on" and "off", etc.) of the tag 10, persisting a state of the tag 10 (e.g., maintaining an "on" state), transitioning a state (e.g., from "idle" to "wake," "lower power" to "higher power," any state to "read," "write," or "erase" state, etc.) of the tag 10, etc. Suitable EM radiation encompasses the electromagnetic spectrum. For example, in one instance, the invoking EM radiation corresponds to the visible and/or non-visible light portion (e.g., from about 300 GHz to about 300 EHz) of the electromagnetic spectrum. This portion of the electromagnetic spectrum includes infrared (IR), visible, ultraviolet (UV), x-rays, and gamma rays. In another instance, the invoking EM radiation alternatively or additionally includes the radio frequency portion (e.g., from about 30 Hz to about 300 GHz) of the electromagnetic spectrum. It is to be understood that the foregoing example are provided explanatory purposes and are not limiting. In other aspects, sources based on audio (e.g., voice), vibration, touch, temperature, etc. alternatively or additionally invoke the tag 10.

The tag 10 includes a sensor 12 that selectively receives the invoking source. Typically, the sensor 12 is configured to detect one or more particular invoking sources. For example, the sensor 12 may include an optical sensor 14 designed to detect EM radiation within the visible and/or non-visible light spectrum. In this instance, sources outside of the defined spectrum may be undetectable and/or ignored. For example, the optical sensor 14 can be a photo-receptor, which typically does not detect radio frequency signals, but detects optical signals. In another example, the optical sensor 14 may be a photo-receptor coupled to other components such as filters, lenses, prisms, and the like that block and/or pass light based on various attributes (e.g., energy, amplitude, frequency, phase, wavelength, periodicity, pattern, etc.). In other instances, various other optical and/or non-optical sensors (not shown) can additionally or alternatively be used to facilitate discriminating between invoking sources. Such discrimination enables the tag 10 to be virtually invisible to unauthorized entities. For example, depending on how the sensor 12 reacts to a particular invoking source, an entity applying the source may not be able to detect the existence of the tag 10, determine whether the tag 10 is receiving the source, determine whether the tag 10 is functional, determine whether the tag 10 is reacting to the source, etc.

The received invoking source, if not indicative of an authorized source (e.g., a signal associated with an authorized user, that has not been corrupted, that has been validated, that has been authenticated, etc.), may reach the sensor 12, but have no affect on the tag 10. If indicative of an authorized signal, the received light can be converted into a signal that affects the state of the tag 10. For example, the reception of suitable light may result in a signal that activates the tag 10 (e.g., transition it to a "wake," "on," "read," "write," "emit," etc. state) and/or deactivates the tag 10 (e.g., transition it to an "idle," "off," "sleep," "low power," etc. state). In addition, the invoking source may affect other components within the tag 10. For instance, the received light may be converted into a signal that controls other componentry (e.g., radio frequency identification (RFID) componentry, smart card componentry, magnetic card componentry, etc.) within the tag 10. In one instance, detection of a photon, a burst of photons, stream of photons, and/or a combination thereof by the sensor 12 invokes the tag 10. In another instance, one or more sequences or patterns of photons, bursts of light, and/or a streams of light detected by the sensor 12 invokes the tag 10. Such sequences can be associated with security in order to mitigate and/or shield access to unauthorized entities and/or authenticate the invoking source and/or provider of the invoking source.

When activated, the tag 10 may remain in an active state until reception of another invoking source such as another photon, burst, stream, and/or combination thereof and/or sequence thereof, and, thereafter, transition to another state. In another instance, the tag 10 may remain active until power from a power storage element (not shown) is drained, for a duration of time associated with power derived from the received light, until lapse of a predefined period, etc. In yet another instance, the tag 10 only remains active while the sensor 12 is receiving an invoking source with suitable characteristics, such as a source associated with a particular energy, amplitude, frequency, phase, wavelength, periodicity, pattern, etc. range. In still another instance, the tag 10 is inactive while the sensor 12 receives the invoking source and becomes active upon termination of the invoking source. For instance, the tag 10 can be affixed to an object that remains stationary. A suitable source can be positioned such that the tag 10 continuously and/or periodically receives the invoking source. If the object is moved such that the source is no longer received, the tag 10 can transition to an "on" state and sound an alarm, notify security, etc.

By way of non-limiting example, an entity (e.g., a human, a robot, a computer, an application, etc.) attempting to affect the state of the tag 10 can direct visible and/or non-visible light at the sensor 12 or at a location believed to be within a detectable range of the sensor 12. For example, a mobile reader and/or writer can be positioned to direct light at the sensor 12. Alternatively, the entity can position the tag 10 within proximity of the reader and/or writer. For example, the tag 10 can be moved through a field interrogated by a reader and/or writer. Upon reception of suitable light by the sensor 12, the tag 10 can transition to an "off" state or an "on" state in which various activities and/or functions can commence and/or terminate. The tag 10 can be designed such that other invoking sources are not detected and/or are detected, but do not permit any type of control over the tag 10.

The tag 10 can be used in a variety of applications including tracking, security clearance, identification, etc. For instance, the tag 10 can be affixed to item and used to obtain information about the item, a location of the item, etc. In another instance, the tag 10 can be carried by an individual and used to obtain information about the individual, determine a location of the individual, automatically provide information for the individual (e.g., automatically transmit a security code to mitigate manual techniques), etc. In addition, the tag 10 may include various other components (not shown) for optically, electrically and/or mechanically receiving, processing, presenting, and/or conveying information. For instance, the tag 10 may include optical and/or radio frequency (e.g., radio frequency identification, or RFID) componentry for receiving and/or conveying optical and/or RF information and/or a processor for processing such information.

Furthermore, the tag 10 may incorporate network ports and/or protocols to communicate with various entities over a network, the Internet, etc. Moreover, micro-mirrors, reflective and/or transmissive liquid crystals, and/or controllable retro-reflectors can be used to facilitate various functions. For example, retro-reflectors can provide an ability for a received light signal to be reflected only in a particular direction, which can reduce the ability for communications to be eavesdropped. In addition, a transmissive liquid crystal display can restrict usage to be between a source and a detector such that the user would have to position the tag 10 between a transmitter and a receptor.

Figure 2:
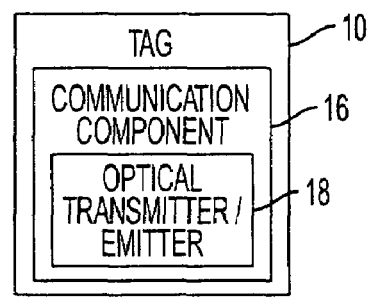
FIG. 2 illustrates the exemplary electromagnetic tag with communication component for transmitting and/or emitting signals.

FIG. 2 illustrates an aspect in which the tag 10 additionally or alternatively includes a communication component 16 that transmits and/or emits ("transmits/emits") signals. The transmitted/emitted signals can be generated from a source within the tag 10 and/or result from perturbing a source traversing, refracting, and/or reflecting from the tag 10. Thus, a transmission/emission may include a modulation of the incident or detected invoking source, for instance, modulated invoking light. In one instance, the communication component 16 includes at least an optical transmitter/emitter 18 (e.g., a photo-diode, etc.) that transmits/emits signals, including optically encoded information. In other instances, the transmitted/emitted signal can include optically, electrically, and/or mechanically encoded, encrypted, password protected, modulated, etc. information. It is to be appreciated that any transmissions/emissions may occur for a predetermined frequency (e.g., about every microsecond) and/or in response to the reception of an invoking source, for example, by the sensor 12 described in connection with FIG. 1. In addition, the transmissions/emissions may indicate a state of the tag 10 and/or other information such as a serial number, a software version, a firmware release, stored data, diagnostics, etc. associated with the tag 10. In some instances, the sensor 12 and the communication component 16 can be substantially the same component, whereas in other instances, these components are separate and distinct.

Figure 3:
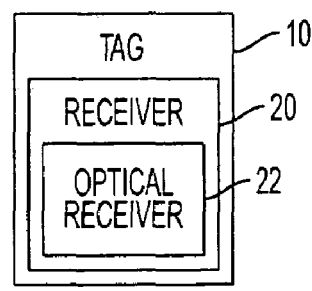
FIG. 3 illustrates the exemplary electromagnetic tag with receiving component for receiving information.

FIG. 3 illustrates an aspect in which the tag 10 additionally or alternatively includes a receiving component ("receiver") 20, which provides a mechanism in which information such as requests, queries, instructions, applications, data, algorithms, activation signals, etc. can be conveyed to and receive by the tag 10. Such information can be provided as raw, encoded, encrypted, and/or otherwise modulated data. In one instance the receiver 20 includes an optical receiver 22, which may include a photo-diode. In this configuration, the reception of light by the optical receiver 22 leads to current flow (e.g., via the photovoltaic effect, reducing resistance, etc.) that is representative of the light. The representation can be optical, electrical, and/or mechanical and can be processed to obtain the information carried by the light. In some instances, the sensor 12 and the receiver 20 can be substantially the same component, whereas in other instances, these components are separate and distinct.

Figure 4:
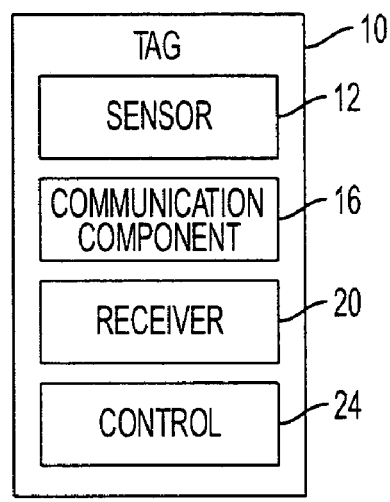
FIG. 4 illustrates the exemplary electromagnetic tag with a control component for controlling components within the tag and functionality of the tag.

FIG. 4 illustrates an aspect in which the tag 10 additionally or alternatively includes a control component 24, which provides a mechanism to handle requests and queries, execute instructions, algorithms and applications, process data and signals, etc and/or control the sensor 12, the communication component 16, and/or the receiver 20. The control component 24 can communicate with the sensor 12, the transmitter/emitter 16, the receiver 20, and/or other components of the tag 10. As such, the control component 24 can receive and/or retrieve signals, information, etc. from the sensor 12 and/or receiver 16 and/or provide data for conveyance by the transmitter/emitter 16. Furthermore, the control component 24 can store, manipulate, delete, remove, discard, write over, extract, copy, etc. information from storage and/or control internal and/or external power sources.

Figure 5:
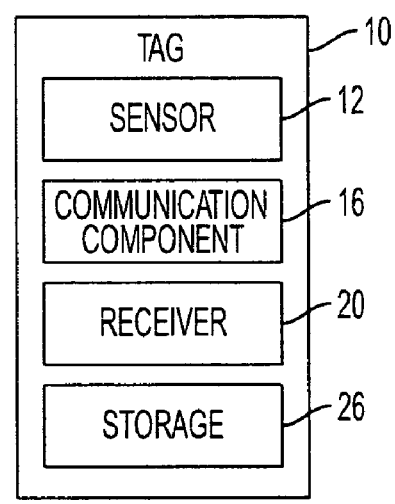
FIG. 5 illustrates the exemplary electromagnetic tag with a storage component for storing information within the tag.

FIG. 5 illustrates an aspect in which the tag 10 additionally or alternatively includes a storage component 26 in which data, instructions, applications, algorithms, etc. are stored. The storage component 26 can include various types of memory as well as other storage elements. Suitable memory includes volatile and non-volatile memory, including Random Access Memory (RAM), Read Only Memory (ROM such as PROM, EPROM and EEPROM), portable flash memory, etc.

Figure 6:
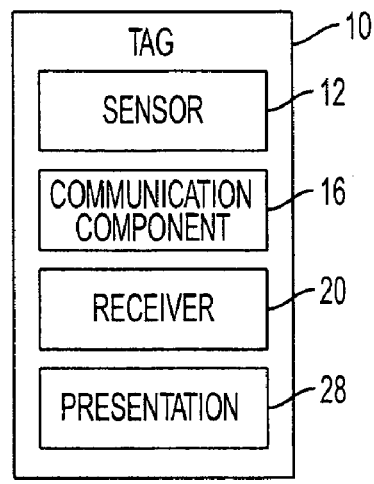
FIG. 6 illustrates the exemplary electromagnetic tag with a presentation component for visually and/or audibly communication.

FIG. 6 illustrates an aspect in which the tag 10 additionally or alternatively includes a presentation component 28, which provides an additional and/or alternative mechanism in which the tag 10 can communicate. For instance, the presentation component 28 can include one or more LEDs, seven segment displays, LCDs, or other light emitting elements and/or other elements that visually, tactilely and/or audibly present information. The presentation component 28 can use such components to indicate that the tag 10 is ready to be read from, written to, and/or erased, a transfer of data was successful, security clearance has been verified, etc. In yet another example, the presentation component 28, when the tag 10 is used in connection with a payment card, may display a total dollar amount of a transaction, whether a transfer was successful, a balance remaining in a user's account, etc. The presentation component 28 can also be connected to various peripherals such as electric paper, printed tape, printer, copiers, facsimiles, plotters, scanners, multi-functional platforms, etc. to generate hard copy and/or electronic representations of such information.

Figure 7:
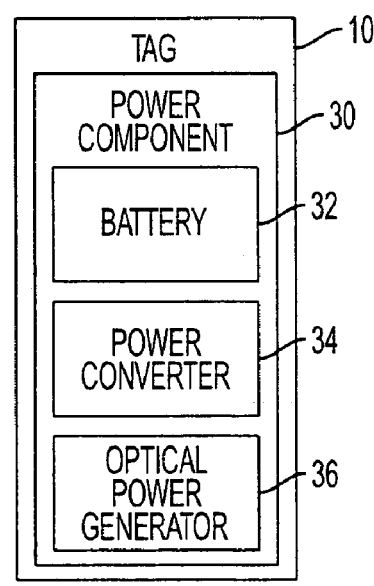
FIG. 7 illustrates the exemplary electromagnetic tag with a power component for energizing the components of the tag.

FIG. 7 illustrates an aspect in which the tag 10 additionally or alternatively includes a power component 30, which provides power to the one or more other components of the tag 10. In one instance, the power component 30 includes a rechargeable and/or non-rechargeable battery 32, which power the components of the tag 10. Examples of suitable batteries include, but are not limited to, lead-acid, Lithium ion (Li), Nickel metal hydride (NiMH), Nickel Cadmium (NiCd), etc. batteries. In another instance, the power component 30 includes circuitry 34 for converting power from an external source (e.g., AC receptacle, DC power supply, etc.) into suitable power for driving the components of the tag 10. This circuitry can include passive and/or active elements for converting, conditioning, filtering, amplifying, processing, etc, AC and/or DC power. In another instance, the power component 30 includes an optical power generator 36, which converts received light into power for the various components of the tag 10, including power to recharge any internal batteries. The optical power generator 36 can be, but is not limited to, a solar cell, a photo-voltaic cell, a photo-transducer, a photo-diode, and a combination thereof. In other instances, the tag 10 might use magnetic, electrostatic, and/or RF fields and/or sound for power. The power component 30 can also be combined with various communications mediums.

Figure 8:
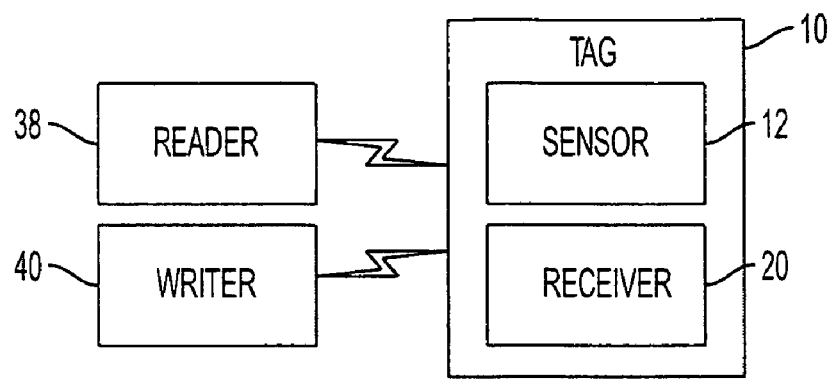
FIG. 8 illustrates a system in which a reader and/or a writer communicates with the tag.

FIG. 8 illustrates a system in which a reader 38 and/or a writer 40 communicate with the tag 10. The reader 38 and/or writer 40 can be embodied in a variety of configurations. For example, in one instance the reader 38 and/or writer 40 may include a modulated light source from an incandescent source, LED, laser, etc. In another example, the reader 38 and/or writer 40 may be integrated with a laser-based barcode scanner. In another example, the reader 38 and/or writer 40 may be incorporate within a camera-enabled mobile phone. For instance, a light source could be integrated into LED-based flash such as that conventionally used in mobile phones. In yet another example, the reader 38 and/or writer 40 could be integrated into a camera lens in which a modified CMOS design incorporating a tag reading and/or writing technology is used.

Figure 9:
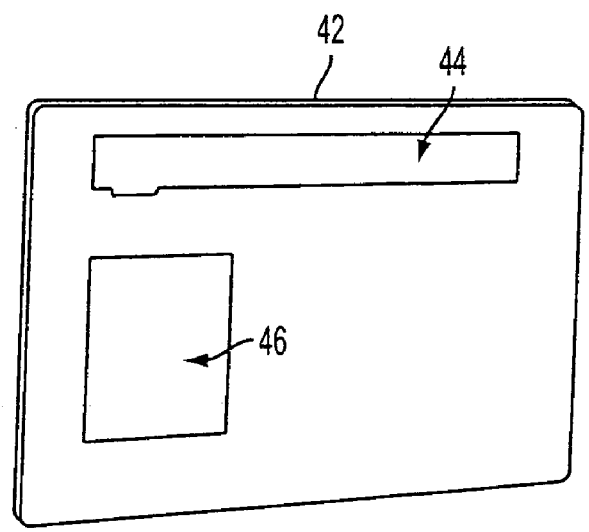
FIG. 9 illustrates a non-limiting example of a structure in which the tag can be incorporated.
Figure 10:
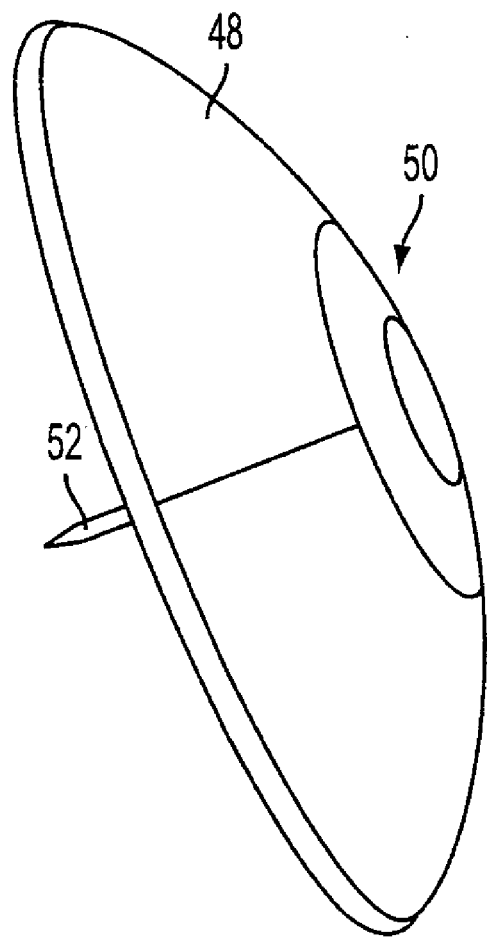
FIG. 10 illustrates another non-limiting example of a structure in which the tag can be incorporated.

FIG. 9 illustrates a non-limiting example of a structure 42 in which the tag 10 can be incorporated. As depicted, the structure 42 can be variously shaped, including shapes resembling a badge, a credit card, a driver's license, etc. As such, the structure 42 can be affixed (e.g., via tape, glue or other adhesive, rivet, screw, connector, etc.) relatively easily to various entities. For instance, the structure 42 can be affixed to the outside of a package, a crate, a lot, etc. Alternatively, the structure 42 can be included with an entity residing in a package, a crate, a lot, etc. Moreover the structure 42 can be easily carried, for example, in a wallet, a pocket, a purse, etc. The tag 10 within the structure 42 can be used to receive, store, process, transmit, emit, etc. optical, electrical, mechanical, etc. signals as described herein and/or otherwise. The structure 42 includes various regions 44 and 46 for incorporating the sensor 12, the transmitter/emitter 16, the receiver 20, and the presentation component 28. FIG. 10 illustrates another non-limiting example of a structure 48 in which the tag 10 can be incorporated. The structure 48 includes a region 50 for incorporating the sensor 12, the transmitter/emitter 16, the receiver 20, and the presentation component 28. In addition, the structure 48 includes a mechanism 52 that facilitates attaching the tag 10 to various entities.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An electromagnetic tag, comprising:
 a communication component, including
  an optical transmitter/emitter that transmits/emits optically encoded information; and
  an optical receiver that detects at least one of an optically encoded signal including at least one of a request, a query, an instruction, an application, data, an algorithm, and an activation command;
 wherein the detected optically encoded signal includes authentication information.

2. The electromagnetic tag as set forth in claim 1, wherein the optically encoded information transmitted/emitted by the optical emitter is at least one of modulated incident light and data stored within the electromagnetic tag.

3. The electromagnetic tag as set forth in claim 1, wherein the optically encoded information is transmitted/emitted based on a predetermined frequency.

4. The electromagnetic tag as set forth in claim 1, wherein the transmitted/emitted optically encoded information includes light within the visible or non-visible regions of the electromagnetic spectrum.

5. The electromagnetic tag as set forth in claim 1, wherein the detected optically encoded signal includes a predetermined authorization pattern of at least one of one or more photons, bursts of photons, and streams of photons.

6. The electromagnetic tag as set forth in claim 1, wherein the detected optically encoded signal invokes the optical transmitter/emitter to transmit/emit the optically encoded information.

7. The electromagnetic tag as set forth in claim 1, further including a photo-detector that detects light from at least one of the visible and the non-visible regions of the electromagnetic spectrum.

8. The electromagnetic tag as set forth in claim 1, wherein the communication component further transmits/emits at least one of electrically and mechanically encoded information.

9. The electromagnetic tag as set forth in claim 1, further including an optical power element that derives power from light and powers the components of the electromagnetic tag.

10. The electromagnetic tag as set forth in claim 1, further including a presentation component that provides at least one of visual, audible, thermal, and tactile information.

11. The electromagnetic tag as set forth in claim 10, wherein the presentation component includes at least one of a light emitting diode (LED), a liquid crystal display (LCD), and a seven segment display.

12. The electromagnetic tag as set forth in claim 1, further including at least one of radio frequency identification (RFID), contact smart card, magnetic card, and contactless smart card componentry.

13. An electromagnetic tag, comprising:
a transmitter/emitter that transmits/emits information; and
a power component that receives light, generates power from the received light, and provides the generated power to energize at least the transmitter/emitterU
an optical receiver that receives at least one of an optically encoded signal including at least one of a request, a query, an instruction, an application, data, an algorithm; wherein the received optically encoded signal includes authentication information.

14. The electromagnetic tag as set forth in claim 13, wherein the power component includes at least one a solar cell, a photo-voltaic cell, a photo-transducer, and a photo-diode for receiving the light and generating the power.

15. The electromagnetic tag as set forth in claim 13, wherein the power component includes at least one of a rechargeable and a non-rechargeable battery that energizes at least the transmitter/emitter.

16. The electromagnetic tag as set forth in claim 13, wherein the power generated by the power component charges an internal battery that energizes at least the transmitter/emitter.

17. The electromagnetic tag as set forth in claim 13, wherein the transmitter/emitter transmits/emits at least optically encoded information.

18. An electromagnetic tag, comprising:
an optical receiver that receives optically encoded information;
an optical transmitter/emitter that transmits/emits optically encoded information; and
an optical power component that converts light into energy that powers the optical receiver and the optical transmitter/emitter;
wherein the received optically encoded information includes a predetermined authorization pattern of at least one of one or more photons, bursts of photons, and streams of photons.

* * * * *